United States Patent
Bourilkov et al.

(10) Patent No.: US 9,071,073 B2
(45) Date of Patent: Jun. 30, 2015

(54) HOUSEHOLD DEVICE CONTINUOUS BATTERY CHARGER UTILIZING A CONSTANT VOLTAGE REGULATOR

(75) Inventors: Jordan T. Bourilkov, Stamford, CT (US); David N. Klein, Southbury, CT (US); In Tae Bae, Wrentham, MA (US); George M. Cintra, Holliston, MA (US)

(73) Assignee: The Gillette Company, Boston, MA (US)

(*) Notice: Subject to any disclaimer, the term of this patent is extended or adjusted under 35 U.S.C. 154(b) by 899 days.

(21) Appl. No.: 11/867,110

(22) Filed: Oct. 4, 2007

(65) Prior Publication Data

US 2009/0091298 A1   Apr. 9, 2009

(51) Int. Cl.
*H02J 7/04* (2006.01)
*H02J 7/00* (2006.01)
*H02J 7/10* (2006.01)

(52) U.S. Cl.
CPC .......... *H02J 7/008* (2013.01); *H02J 7/045* (2013.01); *H02J 7/0072* (2013.01); *H02J 7/04* (2013.01); *H02J 7/0077* (2013.01); *H02J 2007/10* (2013.01); *H02J 7/042* (2013.01)

(58) Field of Classification Search
CPC ......... H02J 7/0077; H02J 7/0072; H02J 7/04; H02J 7/042; H02J 7/045; H02J 2007/10
USPC .......................... 320/160, 140, 145
See application file for complete search history.

(56) References Cited

U.S. PATENT DOCUMENTS

| | | | |
|---|---|---|---|
| 3,214,668 A * | 10/1965 | Brinster | 388/833 |
| 3,327,198 A * | 6/1967 | Rauch | 320/128 |
| 3,336,521 A * | 8/1967 | Russell | 363/24 |
| 3,678,363 A * | 7/1972 | Ringle | 320/160 |
| 3,735,233 A * | 5/1973 | Ringle | 320/141 |
| 3,947,752 A * | 3/1976 | Morgan | 323/284 |
| 4,034,281 A * | 7/1977 | Morita et al. | 323/286 |
| 4,233,553 A | 11/1980 | Prince, Jr. et al. | |
| 4,412,265 A * | 10/1983 | Buuck | 361/18 |
| 4,631,468 A | 12/1986 | Satoh | |
| 4,636,709 A * | 1/1987 | Ohsawa | 323/267 |
| 4,965,506 A * | 10/1990 | Algra et al. | 320/164 |
| 5,028,860 A | 7/1991 | Amano | |
| 5,532,524 A * | 7/1996 | Townsley et al. | 307/64 |
| 5,592,069 A * | 1/1997 | Dias et al. | 320/106 |
| 5,604,425 A * | 2/1997 | Smith | 323/267 |
| 5,969,506 A | 10/1999 | Neal | |

(Continued)

FOREIGN PATENT DOCUMENTS

EP    1 865 272    12/2007

OTHER PUBLICATIONS

Swiffer Sweep and Vac Instruction Manual (Two Pages).

(Continued)

*Primary Examiner* — Richard Isla Rodas
*Assistant Examiner* — Manuel Hernandez
(74) *Attorney, Agent, or Firm* — Fish & Richardson P.C.

(57) ABSTRACT

Charging at least one rechargeable battery includes regulating a voltage applied to the at least one rechargeable battery by coupling a circuit between an output of a rectifier circuit and the at least one rechargeable battery, limiting the charging current to be within a first predetermined range and when a predetermined battery charging voltage is reached, dropping the charging current to be within a second predetermined range.

20 Claims, 7 Drawing Sheets

(56) References Cited

U.S. PATENT DOCUMENTS

| | | | | |
|---|---|---|---|---|
| 6,094,040 | A * | 7/2000 | Meier et al. | 323/284 |
| 6,184,664 | B1 * | 2/2001 | Ponzetta | 323/274 |
| 7,261,979 | B2 | 8/2007 | Gozdz et al. | |
| 7,489,109 | B1 * | 2/2009 | Qian et al. | 320/135 |
| 2002/0171405 | A1 * | 11/2002 | Watanabe | 323/282 |

OTHER PUBLICATIONS

TSM1052: CC/CV controller for chargers and adapters. www.st.com/powermanagement.

LinkSwitch-XT. Design Guide, Application Note AN-40. Power Integrations. Nov. 2005.

* cited by examiner

HOUSEHOLD DEVICE CONTINUOUS BATTERY CHARGER UTILIZING A CONSTANT VOLTAGE REGULATOR

BACKGROUND

Household devices, for example, cordless vacuum cleaners, use embedded batteries and external AC/DC power supply/battery charger units. Typically, the input voltage to the battery charger is not regulated and is higher than the battery charging voltage. During charging of the rechargeable battery, the charging current in the battery charger declines as the battery charging voltage increases. However, at full charge, the battery charger continues to supply trickle charging current to the rechargeable battery.

Many household devices use NiCd or NiMH batteries, which can handle trickle charging current up to about C/50 (50 hours charge rate), where a 1 C rate is a charge rate that corresponds to a charging current that would result in a particular rechargeable battery becoming charged in 1 hour. However, due to cost limitations, many battery chargers do not comply with this requirement and overcharge the batteries when left on continuous charge, thus shortening the battery life. This results in significantly less runtime of the household device after only a short period of service.

SUMMARY

Disclosed is a battery charger device for charging at least one rechargeable battery, the battery charger device dropping the trickle charging current to be below a predetermined limit.

In an aspect, a battery charger device to charge at least one rechargeable battery includes a voltage regulator circuit configured to receive a DC voltage and provide a substantially constant regulated voltage output at a predetermined charging current and at a trickle charging current, the trickle charging current to be below a first predetermined value, and a resistor coupled with an output of the voltage regulator circuit and the at least one rechargeable battery to limit the charging current to be below a first predetermined value.

The following are embodiments within the scope of this aspect.

The battery charger devices further includes an AC/DC adapter circuit to provide a DC voltage to the voltage regulator circuit. The AC/DC adapter circuit includes a transformer having a secondary circuit and a primary circuit, and a rectifier circuit coupled to the secondary circuit of the transformer, the rectifier circuit to provide the DC voltage. The voltage regulator circuit includes a transistor having a control terminal, a current source and a current sink terminal and a diode connected to the control terminal of the transistor, the diode having a voltage characteristic selected to limit the substantially constant regulated DC voltage to be below a third predetermined value. The second predetermined value is lower than the first predetermined value, that is reached at the end of the charging cycle. The transistor is a bipolar junction transistor and the diode is a Zener diode. The resistance value is related to an average difference between the value of the voltage across the at least one rechargeable battery and the substantially constant regulated DC voltage.

The substantially constant regulated voltage output is related to a maximum continuous charge voltage across the at least one rechargeable battery. The battery charger device further includes a load connected to the at least one rechargeable battery. The load is a DC motor of a portable electric device. The at least one rechargeable battery further includes at least one or a plurality of NiCd or NiMH cells.

In an additional aspect, a battery charger device to charge at least one rechargeable battery includes a transformer having a secondary circuit and a primary circuit, a rectifier circuit coupled to the secondary circuit of the transformer, the rectifier circuit to provide a DC voltage; a voltage regulator circuit coupled to the rectifier circuit to provide a substantially constant regulated DC voltage and a charging current to the at least one rechargeable battery, a value of the charging current related to the substantially constant regulated voltage output and a value of a voltage across the at least one rechargeable battery, and a resistor coupled between an output of the voltage regulator circuit and the at least one rechargeable battery, the resistor having a resistance value provided to limit the charging current to be below a first predetermined value.

The following are embodiments within the scope of this aspect.

The voltage regulator circuit further limits a trickle charge current to be below a second predetermined value. The second predetermined value is lower than the first predetermined value. The voltage regulator circuit comprises a transistor having a control terminal, a current source and a current sink terminal; and a diode connected to the control terminal of the transistor, the diode having a voltage characteristic selected to limit the substantially constant regulated DC voltage to be below a third predetermined value. The transistor is a bipolar junction transistor and the diode is a Zener diode.

The resistance value is related to an average difference between the value of the voltage across the at least one rechargeable battery and the substantially constant regulated DC voltage. The substantially constant regulated voltage output is related to a maximum continuous charge voltage across the at least one rechargeable battery. The battery charger device further includes a load connected to the at least one rechargeable battery. The load is a DC motor of a portable electric device. The at least one rechargeable battery further includes at least one or a plurality of NiCd or NiMH cells.

In an additional aspect, a battery charger device to charge at least one rechargeable battery includes a rectifier circuit to provide a DC voltage, circuitry coupled to the rectifier circuit to receive the DC voltage and provide to the at least one rechargeable battery a substantially constant regulated DC voltage at a predetermined value of a charging current, the predetermined value related to a value of a voltage across the at least one rechargeable battery and a predetermined value of a trickle charging current, the predetermined value to be below a predetermined limit. In some embodiments, the circuitry is implemented by a switch-mode AC/DC adapter circuit.

One or more aspects may provide one or more advantages. The details of one or more embodiments of the invention are set forth in the accompanying drawings and the description below. Other features, objects, and advantages of the invention will be apparent from the description and drawings, and from the claims.

DETAILED DESCRIPTION

Figure 1:
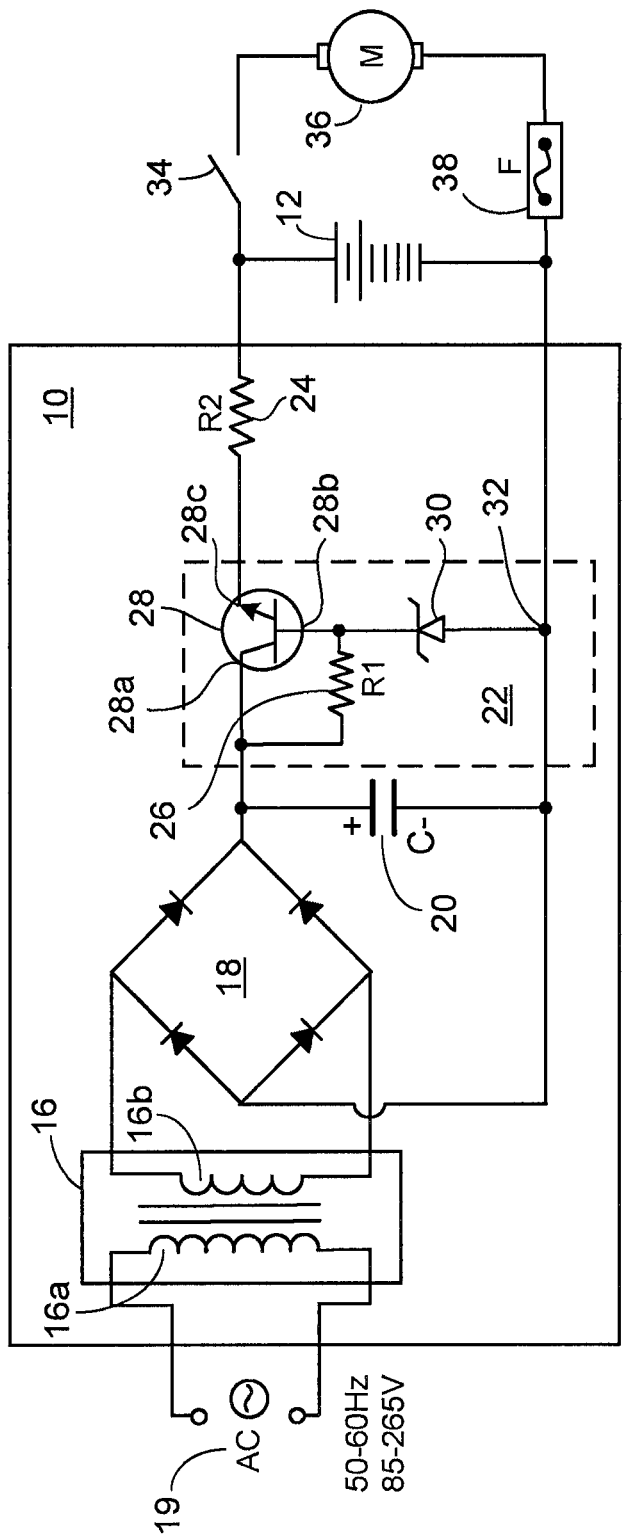
FIG. 1 is a circuit schematic of a household device battery charger.

Referring to FIG. 1, an exemplary household device charger or rechargeable battery charger device 10 to charge at least one rechargeable battery 12 that has at least one rechargeable cell is shown. The rechargeable battery 12 is typically used in household or portable electronic devices such as, for example, wireless vacuum cleaners, cordless telephones and rechargeable flashlights. In some embodiments, the rechargeable battery 12 includes NiCd or NiMH cells having cadmium or hydrogen-absorbing alloy for the anode and nickel for the cathode. Although FIG. 1 shows a single rechargeable battery 12, the rechargeable battery charger device 10 may be adapted to receive and charge two or more rechargeable batteries at the same time. Further, the rechargeable battery charger device 10 may charge different battery types including, for example, cylindrical batteries or prismatic batteries.

The rechargeable battery charger device 10 is electrically coupled to an external AC power source 14, such as a source providing power at a rating of 85V-265V and 50 Hz-60 Hz. As shown, the AC power source 14 is coupled to a transformer 16 in the rechargeable battery device 10. In some embodiments, the transformer 16 is a current-limited linear transformer having a primary winding 16a and a secondary winding 16b.

The rechargeable battery charger device 10 includes a rectifier circuit, e.g., a full wave rectifier circuit 18 coupled to the secondary winding 16b of the transformer 16. A stepped-down AC voltage is induced at the secondary winding 16b from the AC power source 14 coupled to the primary winding 16a of the transformer 16.

The full wave rectifier circuit 18 converts the stepped-down AC voltage to a low DC voltage (e.g., 1.5-14V) that is at a level suitable for charging the rechargeable battery 12, e.g., DC voltages at levels of approximately between 1.0-1.5 V for each NiCD or NiMH cell described above. Other types of cells may have different voltage levels.

A filter capacitor 20 is coupled across the output of the full wave rectifier circuit 18. An open circuit voltage across such a filter capacitor 20 would be about 50% higher than the voltage across the rechargeable battery 12. As the battery charging voltage increases, the voltage difference between the filter capacitor 20 and the rechargeable battery 12 decreases, while supplying nominal charging current.

The full wave rectifier circuit 18 is coupled to a voltage regulator circuit 22 which, in turn, is connected to a current limiting resistor 24. The voltage regulator circuit 22 includes a resistor 26, a transistor, e.g., bi-polar junction transistor 28, having a current sink terminal, e.g., collector 28a, a control terminal, e.g., base 28b, and a current source terminal, e.g., emitter 28c, and a diode, e.g. Zener diode 30, coupled in reverse bias between the control terminal 28b of the transistor 28 and a ground terminal 32. Alternatively, the transistor 28 is a field effect transistor. Alternatively, the voltage regulator circuit 22 is implemented by an integrated voltage regulator chip, such as, for example, a three-terminal adjustable linear voltage regulator chip (LM 317).

A value of the output voltage of the voltage regulator circuit 22 is a function of the maximum continuous charging voltage that is permissible across the rechargeable battery 12. For example, in order to operate a typical, portable vacuum cleaner, a 7.2 V battery having six rechargeable NiCd cells in series is required. Accordingly, the maximum charging voltage across the rechargeable battery 12 and thus the value of the output voltage across the terminals of the voltage regulator circuit 22 is selected to be higher than 7.2 V (e.g., 8.4 V).

The voltage drop between the control 28b and current source 28c terminals for a bipolar junction transistor (transistor 28) is typically around 0.6 V. Thus, in embodiments in which the maximum charging voltage is 8.4 V, a Zener diode having a reverse breakdown voltage characteristic at 9 V (0.6V plus 8.4V) is provided as the diode 30 to compensate for the voltage drop.

The resistance value of the current limiting resistor 24 is related to the desired charging current, the average difference between the charging voltage across the rechargeable battery 12 and the value of the output voltage of the voltage regulator circuit 22. As described above, in one example, the value of the output voltage of the voltage regulator circuit 22 is selected to be 8.4 V (the maximum charging voltage across the rechargeable battery 12) Accordingly, if the average battery charging voltage is 7.8 V, and the desired charging current is 150 mA, the resistance value of the current limiting resistor 24 is around (8.4 V-7.8 V)/0.15 A~4 Ohms.

The desired charging current for the rechargeable battery charger device 10 is selected based on the time available for charging. For example, in some embodiments, the charging current to be used in the rechargeable battery charger device 10 is selected to be an average of C/10 (10 hours charge rate).

The resistance value of the current limiting resistor 24 in the rechargeable battery charger device 10 is also selected to limit the trickle charging current to be below a predetermined limit. Thus, when the voltage across the rechargeable battery 12 approaches the value of the output voltage across the terminals of the voltage regulator circuit 22, e.g., 8.4 V (1.4 V/rechargeable cell), the charging current drops to a trickle charge value that is below the predetermined limit.

For example, after the first 10 hours of charge (e.g., a full charge cycle at an average of C/10 charge rate), when the voltage across the rechargeable battery 12 approaches 8.4 V, the charging current supplied by the rechargeable battery charger device 10 automatically drops to C/50 or lower. As a result, the rechargeable battery 12 is maintained in a healthy state regardless of the usage or charging pattern.

The rechargeable battery 12 is connected to a load, e.g., load motor 36 of a typical household device, e.g., a portable vacuum cleaner through a switch 34. As shown, a fuse 38 is typically included in the rechargeable battery charger device 10 to protect the rechargeable battery 12 and load motor 36 from load currents greater than a predetermined rated value (e.g., ~20 A).

In some embodiments, the transformer 16 and the full wave rectifier circuit 18 are disposed within an AC power source adapter (not shown), rather than within the rechargeable battery charger device 10 (FIG. 1). Accordingly, the AC/DC adapter would receive an AC voltage and provide a DC voltage. In other embodiments the transformer 16 is disposed in an AC power source adapter (not shown), and the full wave rectifier circuit 18 is part of the rechargeable battery charger device, similar to that shown in FIG. 1.

Figure 2:
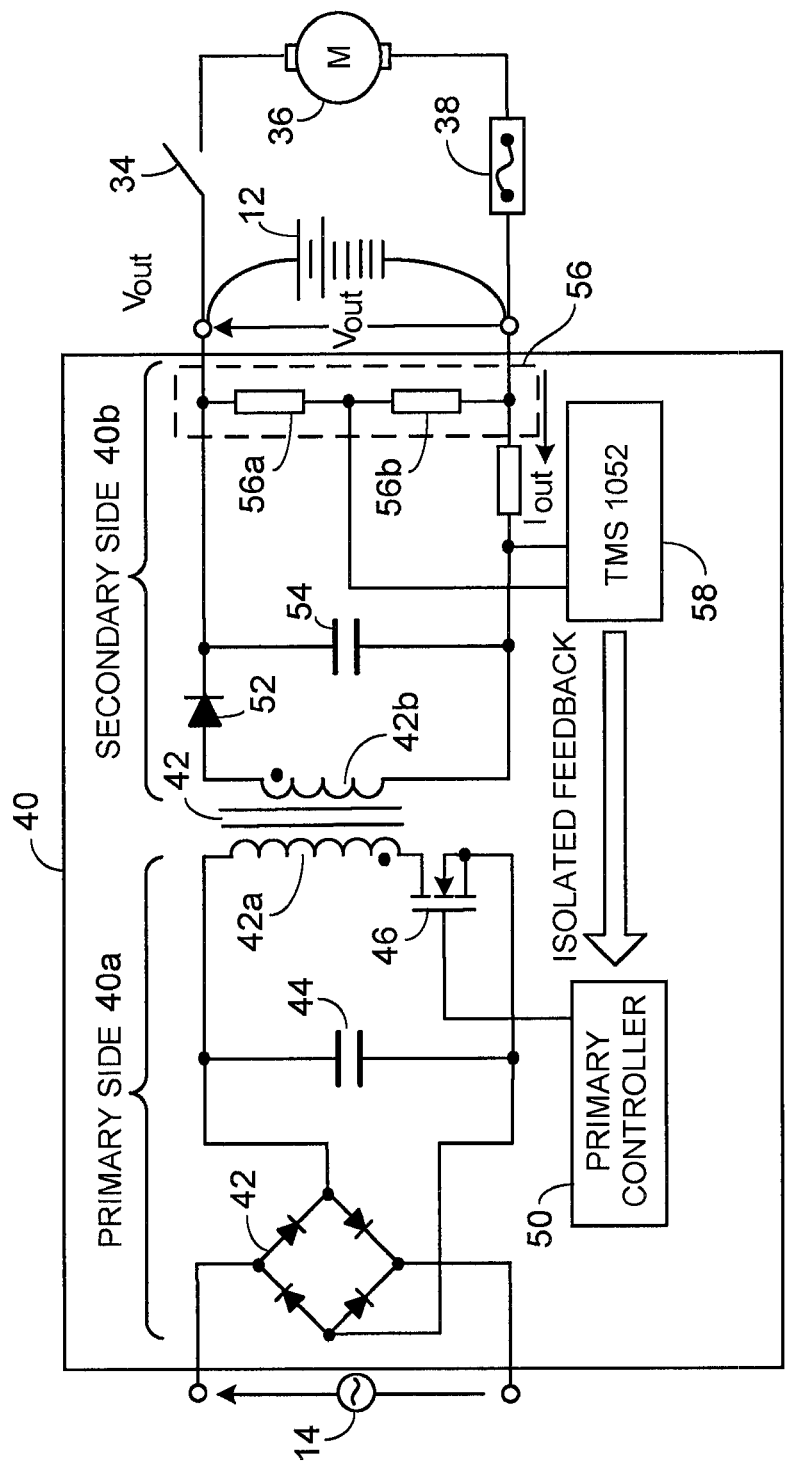
FIG. 2 is a circuit schematic of an alternative household device battery charger implemented using a switch-mode AC/DC adapter circuit.

Referring now to FIG. 2, an alternative arrangement for the rechargeable battery charger device, is a switch-mode AC/DC adapter circuit 40 as shown. This arrangement 40 includes a full wave rectifier 41 on the primary side of the transformer 42 and has the voltage regulator implemented using an integrated controller device. As shown, at least one rechargeable battery 12 is connected across the output terminals of the switch-mode AC/DC adapter circuit 40. As described above, the switch-mode AC/DC adapter circuit 40 receives and charges more than one rechargeable battery at the same time. In addition, the switch-mode AC/DC adapter circuit 40 may charge different battery types including, for example, cylindrical batteries or prismatic batteries.

The rechargeable battery 12 is connected to a load, e.g., load motor 36 of a vacuum cleaner, through switch 34 and fuse 38.

The switch-mode AC/DC adapter circuit 40 includes the transformer 42 having a primary winding 42a and a secondary winding 42b. Accordingly, the switch-mode AC/DC adapter circuit 40 has a primary side 40a and a secondary side 40b.

The primary side 40a of the switch-mode AC/DC adapter circuit 40 includes a full wave rectifier circuit 42 coupled to an AC power source 14 and a capacitor 44 coupled across the output terminals of the full wave rectifier circuit 42. A switching transistor 46 is also connected in series with the primary winding 42a of the transformer 42. In some embodiments, the switching transistor 46 is implemented using a metal-oxide-semiconductor field-effect transistor (MOSFET).

A primary controller 50 controls the switching cycle of the switching transistor 46. Accordingly, the primary controller 50 turns the switching transistor 46 on and off with a feedback-controlled duty cycle.

The secondary side 40b of the switch-mode AC/DC adapter circuit 40 includes a rectifier diode 52 connected in series with the secondary winding 42B of the transformer 42 and a filter capacitor 54 connected to the anode terminal of the rectifier diode 52. The terminals of the filter capacitor 54 are further coupled to a voltage divider circuit 56 having resistors 56a and 56b.

A secondary side controller 58 is coupled across resistor 56b of the voltage divider circuit 56. In some embodiments, the secondary side controller 58 has control loops to perform both current and voltage regulation. The secondary side controller 58 is implemented by an integrated controller chip, such as, for example, TSM1052 from STMicroelectronics, Geneva, Switzerland. The secondary side controller 58 further transmits the feedback signals, $V_{out}$ and $I_{out}$ to the primary controller 50 through an isolated optical transmission path 60.

Figure 3A:
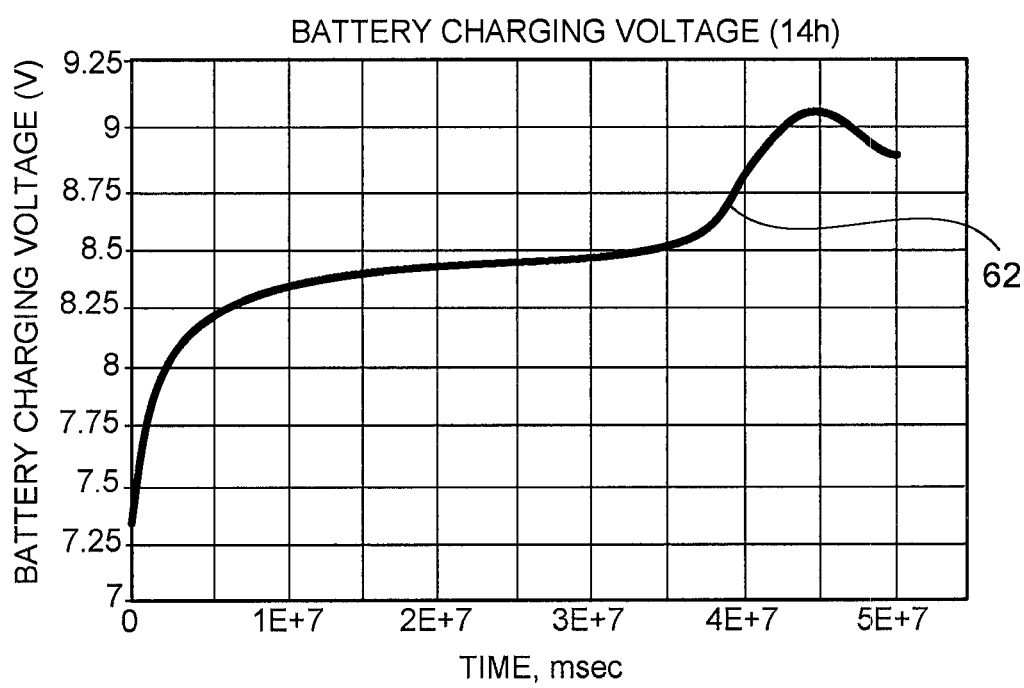
FIGS. 3A-C are a series of plots that illustrate exemplary battery charging voltage, battery charging current, and trickle charging current behaviors, respectively, for a 7.2 V NiCd rechargeable battery using a conventional charger circuit.
Figure 3B:
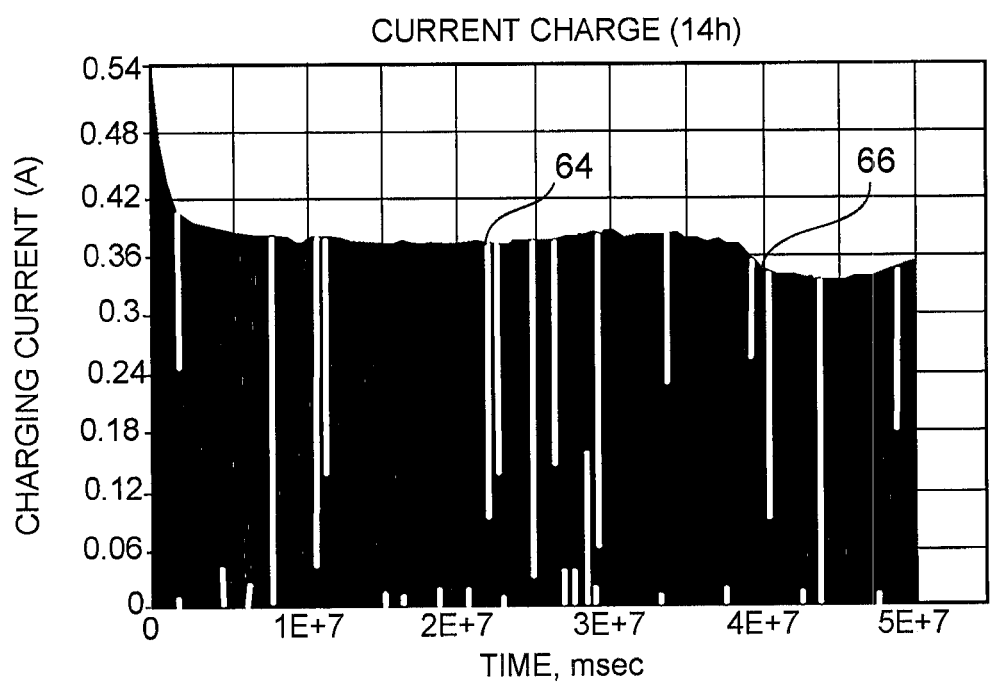
Figure 3C:
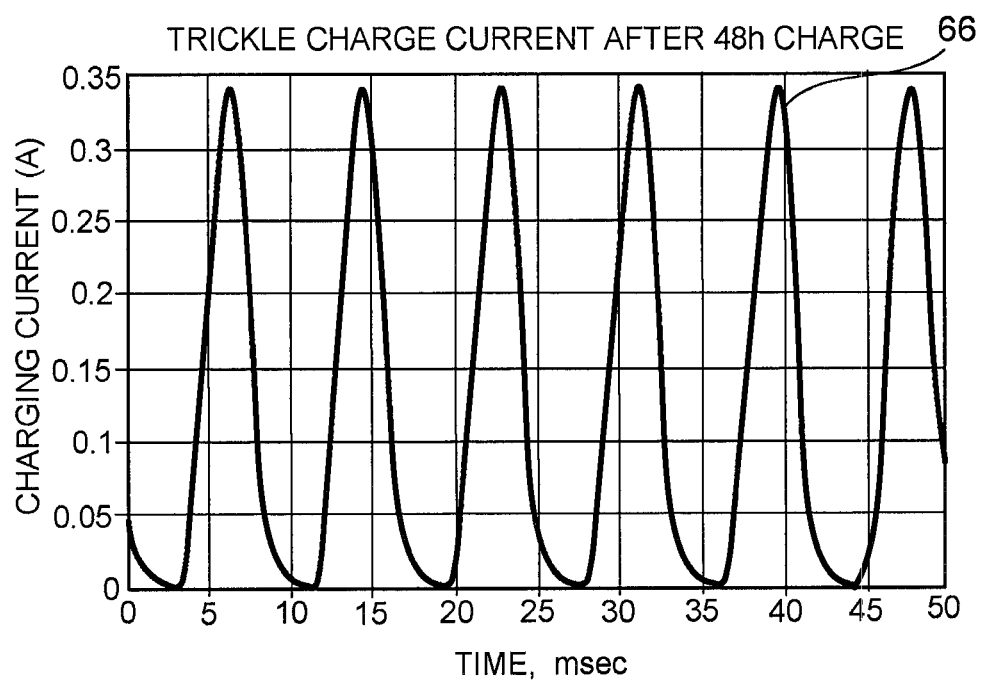

FIGS. 3A-C illustrate exemplary battery charging voltage 62, battery charging current 64, and trickle charging current 66 behaviors, respectively, for a 7.2 V NiCd rechargeable battery using a conventional charger circuit (not shown).

As shown in FIG. 3B, although the battery charging current 64 drops a little, the trickle charging current 66 remains significant even after the rechargeable battery is fully charged (approximately 10 hours). As shown in FIG. 3C, the instantaneous trickle charging current 66 after 48 hours of charge fluctuates so that the peak value is around 330 mA. As described above, for a NiCd battery of 7.2 V, the recommended trickle charge limit is around 30 mA, e.g., C/50 or 6×1500/50 at a one hour charge rate. Consequently, overcharging the rechargeable battery 12 continuously in this manner shortens the life of the rechargeable battery 12 and reduces the runtime of the household device.

Figure 4A:
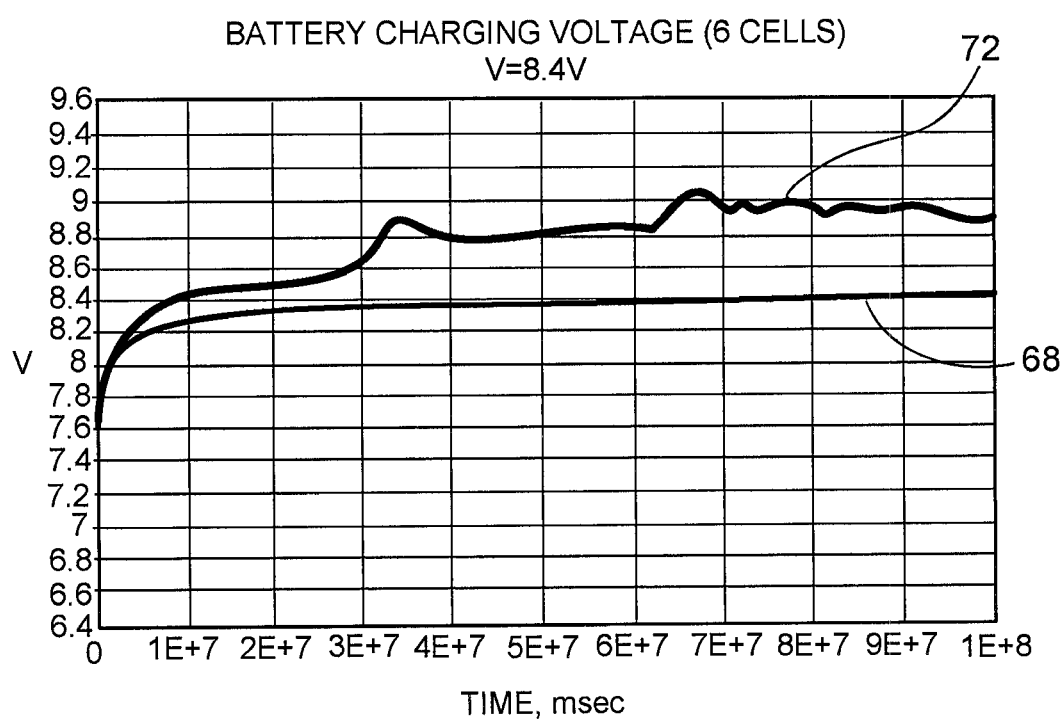
FIGS. 4A-B are a series of plots that illustrate exemplary battery charging voltage and battery charging current behaviors using an exemplary embodiment of the household device battery charger and a conventional charger circuit respectively.
Figure 4B:
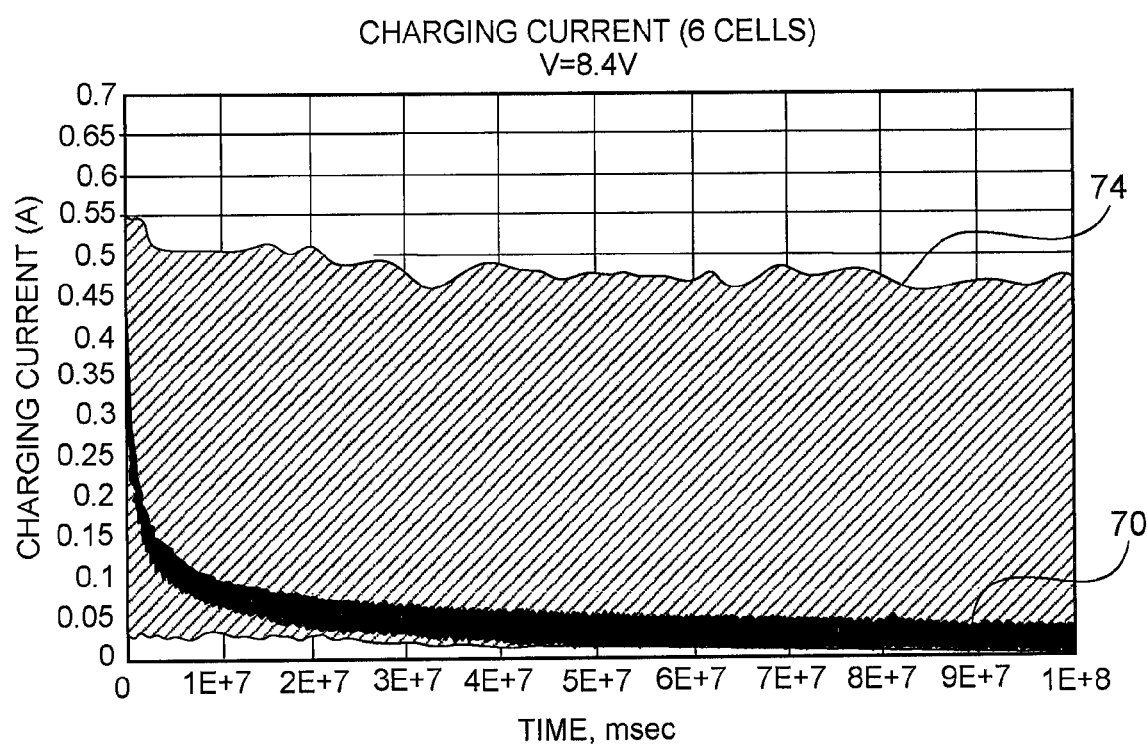

FIGS. 4A-B illustrate exemplary battery charging voltage 68 (voltage across the at least one rechargeable battery 12 in FIG. 1) and battery charging current 70 behaviors, respectively, for six 1500 mAh NiCd cells in series subjected to over 24 hours of charge at a constant voltage of 8.4 V and current limited up to 500 mA using a rechargeable battery charger of the type shown in either of FIG. 1 or FIG. 2. Exemplary battery charging voltage 72, and the battery charging current 74 behaviors, respectively, for the six 1500 mAh NiCd cells in series subjected to the over 24 hours of charge at a constant voltage of 8.4 V using a conventional rechargeable battery charger circuit are also shown. At a maximum charging current of about 500 mA, the NiCD batteries that were initially substantially entirely depleted, would become fully charged in approximately 10 hours.

When the battery charging current, e.g., exemplary battery charging currents 70, 74, is applied to the rechargeable battery 12, the battery charging voltage, e.g., exemplary battery charging voltages 68, 72, at the output terminals of the rechargeable battery charger device 10 increases and reaches an average voltage level of 8.2-8.6 V (8.4V plus/minus 0.2V). Thereafter, the battery charging voltage 68 corresponding to embodiments of the rechargeable battery charger device 10, e.g., circuit shown in FIG. 1, is maintained at a constant voltage level. For comparison, the battery charging voltage 72 corresponding to a conventional rechargeable battery charger circuit is also shown in FIG. 4A. As shown, the conventional rechargeable battery charger circuit depicts uneven output voltage.

After full charge is achieved, the rechargeable battery charger device 10 causes the fluctuations, e.g., spikes appearing in the exemplary battery charging current 70, to average to below a very low predetermined trickle charge value, e.g., lower than C/50. For example, an average value of the battery charging current 70 drops to be below 30 mA, i.e., 1 C=1500 mAh; C/50=30 mAh. Subsequently, the battery charging current 70 continues to remain at the very low predetermined trickle charge value until the rechargeable battery 12 is removed from the rechargeable battery charger device 10.

OTHER EMBODIMENTS

A number of embodiments of the invention have been described. Nevertheless, it will be understood that various modifications may be made without departing from the spirit and scope of the invention. Accordingly, other embodiments are within the scope of the following claims.

What is claimed is:

1. A battery charger device configured to charge at least one rechargeable battery, the device comprising:
    a voltage regulator circuit configured to receive a voltage and provide a substantially constant regulated output voltage at a charging current during charging of the rechargeable battery and at a trickle charging current subsequent to the rechargeable battery reaching substantially full charge; and
    a resistor connected in series with an output of the voltage regulator circuit and the at least one rechargeable battery, the resistor having a resistance value to limit the charging current to be below a first predetermined value and to limit the trickle charging current to be below a second, different predetermined value.

2. The device of claim 1 further comprising an AC/DC adapter circuit to provide a DC voltage to the voltage regulator circuit.

3. The device of claim 2 wherein the AC/DC adapter circuit comprises:
    a transformer having a secondary circuit and a primary circuit; and
    a rectifier circuit coupled to the secondary circuit of the transformer, the rectifier circuit to provide the DC voltage.

4. The device of claim 1 wherein the voltage regulator circuit comprises:
    a transistor having a control terminal, a current source and a current sink terminal; and a diode connected to the control terminal of the transistor, the diode having a voltage characteristic selected to limit the substantially constant regulated DC voltage to be below a third predetermined value.

5. The device of claim 4 wherein the transistor is a bipolar junction transistor and the diode is a Zener diode.

6. The device of claim 1 wherein a resistance value of the resistor is related to an average difference between the value of the voltage across the at least one rechargeable battery and the substantially constant regulated output voltage.

7. The device of claim 1 wherein the substantially constant regulated voltage output is related to a maximum continuous charge voltage across the at least one rechargeable battery.

8. The device of claim 1 further comprising a load connected to the at least one rechargeable battery.

9. The device of claim 8 wherein the load is a DC motor of a portable electric device.

10. The device of claim 1 wherein the at least one rechargeable battery further includes at least one or a plurality of NiCd or NiMH cells.

11. A battery charger device to charge at least one rechargeable battery, the device comprising:
   a transformer having a secondary circuit and a primary circuit;
   a rectifier circuit coupled to the secondary circuit of the transformer, the rectifier circuit to provide a DC voltage;
   a voltage regulator circuit coupled to the rectifier circuit to provide a substantially constant regulated DC voltage at a charging current during charging of the at least one rechargeable battery and at a trickle charging current subsequent to the at least one rechargeable battery reaching substantially full charge, a value of the charging current related to the substantially constant regulated voltage output and a value of a voltage across the at least one rechargeable battery; and
   a resistor coupled in series between an output of the voltage regulator circuit and the at least one rechargeable battery, the resistor having a resistance value provided to limit the charging current to be below a first predetermined value and to limit the trickle charging current to be below a second, different predetermined value.

12. The device of claim 11 wherein the voltage regulator circuit and the resistor limit the trickle charge current to be below the second, different predetermined value.

13. The device of claim 11 wherein the voltage regulator circuit comprises:
   a transistor having a control terminal, a current source and a current sink terminal; and
   a diode connected to the control terminal of the transistor, the diode having a voltage characteristic selected to limit the substantially constant regulated DC voltage to be below a third predetermined value.

14. The device of claim 11 wherein the resistance value is related to an average difference between the value of the voltage across the at least one rechargeable battery and the substantially constant regulated DC voltage.

15. The device of claim 11 wherein the substantially constant regulated voltage output is related to a maximum continuous charge voltage across the at least one rechargeable battery.

16. The device of claim 11 further comprising a load connected to the at least one rechargeable battery.

17. The device of claim 16 wherein the load is a DC motor of a portable electric device.

18. The device of claim 11 wherein the at least one rechargeable battery further includes at least one or a plurality of NiCd or NiMH cells.

19. A battery charger device configured to charge at least one rechargeable battery, the device comprising:
   a rectifier circuit to provide a DC voltage;
   circuitry coupled to the rectifier circuit to receive the DC voltage and provide to the at least one rechargeable battery a substantially constant regulated DC voltage at:
   a first predetermined value of a charging current during charging of the at least one rechargeable battery;
   a second, different predetermined value of a trickle charging current subsequent to the rechargeable battery reaching substantially full charge; and
   a resistor coupled between the circuitry a terminal that receives the at least on rechargeable battery to limit the charging current to be below the first predetermined value and to limit the trickle charging current to be below the second, different predetermined value.

20. The device of claim 19 wherein the circuitry is a switch-mode AC/DC adapter circuit.

* * * * *